US006716889B1

(12) United States Patent
Lütjens et al.

(10) Patent No.: US 6,716,889 B1
(45) Date of Patent: *Apr. 6, 2004

(54) PROCESS FOR THE PREPARATION OF STRONGLY BASIC ANION EXCHANGERS USING ETHYLENE OXIDE

(75) Inventors: Holger Lütjens, Köln (DE); Axel Ingendoh, Odenthal (DE); Karl-Rudolf Gassen, Ratingen (DE); Peter Wenzl, Köln (DE); Klaus Rall, Köln (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,134

(22) Filed: Apr. 2, 1998

(30) Foreign Application Priority Data

Apr. 9, 1997 (DE) .......................................... 197 14 582

(51) Int. Cl.[7] .................................................. C08F 8/28
(52) U.S. Cl. .......................................... 521/34; 525/385
(58) Field of Search ............................. 521/34; 525/385

(56) References Cited

U.S. PATENT DOCUMENTS

| 2,689,832 | A | * | 9/1954 | Hwa ............................ 521/34 |
|---|---|---|---|---|
| 2,788,330 | A | * | 4/1957 | Gilwood ....................... 521/32 |
| 4,077,918 | A | * | 3/1978 | Corte et al. ................... 521/32 |
| 4,213,898 | A | * | 7/1980 | Entschel et al. |
| 4,232,125 | A | * | 11/1980 | Buske .......................... 521/32 |
| 4,675,180 | A | * | 6/1987 | Gunter ......................... 424/70 |
| 4,719,145 | A | * | 1/1988 | Neely .......................... 428/327 |
| 5,187,214 | A | * | 2/1993 | Govindan ..................... 524/17 |
| 5,726,210 | A | * | 3/1998 | Teraue ......................... 521/32 |

FOREIGN PATENT DOCUMENTS

| DE | 10 54 715 B | 4/1959 |
|---|---|---|
| GB | 448 251 | 12/1934 |
| GB | 721 979 | 1/1955 |

OTHER PUBLICATIONS

R. Seymour et al., Polymer Chemistry, An Introduction, 2nd Ed., (1988), 467, Marcel Dekker (New York).*

Chemical Abstract vol. 55 (1961) p. 5809.

* cited by examiner

Primary Examiner—Bernard Lipman
(74) Attorney, Agent, or Firm—Godfried R. Akorli; Diderico van Eyl

(57) ABSTRACT

Reacting weakly basic anion exchangers bearing tertiary amino groups with ethylene oxide under pH control and addition of acid leads to superior strongly basic anion exchangers.

12 Claims, No Drawings

PROCESS FOR THE PREPARATION OF STRONGLY BASIC ANION EXCHANGERS USING ETHYLENE OXIDE

The invention relates to a process for the preparation of strongly basic anionic exchangers based on cross-linked vinylaromatic polymers by reacting weakly basic anion exchangers bearing tertiary amino groups with ethylene oxide under defined conditions.

BACKGROUND OF THE INVENTION

Weakly basic anion exchangers are water-insoluble polymers which contain primary and/or secondary and/or tertiary amino groups, the anion exchangers containing primary amino groups being able to serve as starting materials for the preparation of the anion exchangers containing secondary or tertiary amino groups or containing quaternary ammonium groups.

Strongly basic anion exchangers contain quaternary ammonium groups, preferably those of the type I:

or of the type II

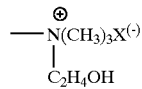

where X in each case denotes an anion, such as hydroxyl, chloride, bromide, iodide, fluoride, sulfate, sulfide, hydrogensulfate, hydrogensulfide, phosphate, di-phosphate, mono-phosphate, carbonate, hydrogene carbonate, citrate, tartrate, phthalate.

The two types differ in basicity and as is also otherwise customary in ion exchanger technology, in the case of anion exchangers, depending on the type of object to be fulfilled, the resin is selected according to its basicity. Whereas the anion exchangers of type I can be synthesized by reacting resins bearing primary amino groups with conventional alkylating agents such as methyl chloride, those of type II are obtained by reacting resins bearing tertiary amino groups with chloroethanol. A reaction of this type II is described, for example, in Example 6 of DE-B 1 054 715: there, ethylene oxide is passed at 30° C. through a mixture of dilute sulphuric acid and-a weakly basic anion exchanger bearing dimethylamino groups.

However, it has been found that although these strongly basic anion exchangers fulfil their assigned task, impurities which originate from their preparation or are formed during use are released to their environment. The object of the invention was therefore to provide strongly basic anion exchangers of the type II which are superior in this respect to the ion exchangers of the prior art.

In the past, attempts have been made to remove compounds formed in the preparation of the ion exchangers—whether they be unreacted starting materials or low-molecular-weight non-cross-linked polymers—by repeated washing with water, which is complex and only partially successful.

SUMMARY OF THE INVENTION

Surprisingly, it has now been found that superior strongly basic anion exchangers of the type II are formed if, during the quaternization, certain temperature and pH conditions are employed.

The invention therefore relates to a process for the preparation of strongly basic anion exchangers based on cross-linked vinylaromatic polymers by reacting weakly basic anion exchangers bearing tertiary amino groups with ethylene oxide, characterized in that the weakly basic anion exchangers are reacted with ethylene oxide at 70 to 75° C. and at a pH of 7 to 11, preferably 8 to 10.

DETAILED DESCRIPTION OF THE INVENTION

The vinylaromatic polymers underlying the ion exchangers are polymers based on vinylaromatics such as styrene, vinyltoluene, ethylstyrene, α-methylstyrene, chlorostyrene, o-chloromethylstyrene, m-chloromethylstyrene, p-chloromethylstyrene, vinylpyridine, vinylnaphthalene. Use can also be made of polymers in whose preparation nonaromatic monomers containing one copolymerizable double bond per molecule are used conjointly. Such monomers include, for example, acrylic acid, methacrylic acid, acrylates, methacrylates, acrylonitrile, methacrylonitrile, acrylamide, methacrylamide, vinyl chloride, vinylidene chloride, vinyl acetate. The monoethylenically unsaturated monomers for the preparation of the vinylaromatic polymers preferably contain no more than 10% by weight of these nonaromatic monomers, based on the total weight of the monomers.

The vinylaromatic polymers are cross-linked, preferably by copolymerization with cross-linking monomers having more than one, preferably 2 or 3, copolymerizable C=C. double bond(s) per molecule. Such cross-linking polymers include, for example, polyfunctional vinylaromatics such as di- and trivinylbenzenes, divinylethylbenzene, divinyltoluene, divinylxylene, divinylnaphthalene, polyfunctional allyl aromatics such as diallylbenzenes and triallylbenzenes, cyanurates and isocyanurates such-as trivinyl cyanurate, triallyl cyanurate, trivinyl isocyanurate and triallyl isocyanurate, N,N'-$C_1$–$C_6$-alkylenediacrylamides and -dimethacrylamides such as N,N'-methylenediacrylamide and -dimethacrylamide, N,N'-ethylenediacrylamide and -dimethacrylamide, polyvinyl ethers and polyallyl ethers of saturated $C_2$–$C_{20}$-polyols having 2 to 4 OH groups per molecule, such as ethylene glycol divinyl ether and ethylene glycol diallyl ether and diethylene glycol divinyl ether and diethylene glycol diallyl ether, esters of acrylic and methacrylic acid with unsaturated $C_3$–$C_{12}$-alcohols or of saturated $C_2$–$C_{20}$-polyols having 2 to 4 OH groups per molecule, such as allyl methacrylate, ethylene glycol di(meth)acrylate, glycerol tri(meth)acrylate, pentaerythritol tetra(meth)acrylate and divinylethyleneurea and divinylpropyleneurea, divinyl adipate, aliphatic and cycloaliphatic olefins having 2 or 3 isolated C=C. double bonds, such as hexa-1,5-diene, 2,5-dimethylhexa-1,5-diene, octa-1,7-diene, 1,2,4-trivinylcyclohexane. Cross-linking monomers which have proved to be particularly useful are divinylbenzene (as mixture of isomers) and mixtures of divinylbenzene and aliphatic $C_6$–$C_{12}$-hydrocarbons containing 2 or 3-C=C. double bonds. The cross-linking monomers are generally used in amounts of 2 to 20% by weight, preferably 2 to 12% by weight, based on the total amount of the polymerizable monomers used.

The cross-linking monomers need not be used in pure form, but can also be used in the form of their industrially handled mixtures of lower purity (eg. divinylbenzene in mixtures with ethylstyrene).

For the preparation of the weakly basic anion exchangers from the cross-linked vinylaromatic polymers, the chloromethylation process or the aminomethylation process—in each case followed by subsequent amination—can be used.

By the chloromethylation process, chloromethyl group-containing cross-linked vinylaromatic polymers are prepared, which are then reacted with non-tertiary amines or polyamines, eg. the reaction of cross-linked polystyrene with monochlorodimethyl ether and subsequent amination with dimethylamine.

In contrast, according to the aminomethylation process, cross-linked vinylaromatic polymers are reacted with reactive phthalimide derivatives, such as N-chloromethyl-phthalimide, and the resulting imides are hydrolyzed to give the corresponding primary amines. These primary amino groups can then themselves be reacted with customary alkylating agents, such as methyl chloride, or can be reacted by Leuckart-Wallach reductive alkylation using carbonyl compounds and formic acid as reducing agent.

The cross-linked vinylaromatic polymers bearing tertiary amino groups represent the starting materials for the process according to the invention. They preferably contain 0.3 to 2 amino groups per aromatic nucleus. The starting materials can be in gel form or macroporous.

It is advisable to suspend the weakly basic anion exchanger (=starting material) in water in the tertiary amine form with stirring. Generally, the water is heated to the intended reaction temperature already prior to the addition of the starting material or, alternatively, the suspension of the starting material in water is heated to the intended reaction temperature. Ethylene oxide is then introduced in stages or—preferably—as far as possible continuously at a rate which permits reliable temperature control. The pH is continuously controlled during this but kept in the range according to the claims by adding a suitable inorganic strong acid, for example sulphuric acid, phosphoric acid, hydrochloric acid and those acids having a pka <2, more precisely preferably during the entire course of the reaction. The total amount of the acid to be added is generally 0.4 to 0.6, preferably 0.48 to 0.52, mol, based on amino groups in the starting material.

If it is wished to convert the tertiary amino groups as quantitatively as possible to quaternary ammonium groups, it is advisable to use up to 3, preferably 1.05 to 1.5, mol of ethylene oxide per mol of tertiary amino groups. After the ethylene oxide addition is completed, a certain extra time is allowed for further reaction. The progress of the reaction may be followed in this case by analyzing samples taken off. After completion of the reaction, residual ethylene oxide is taken off, the reaction product is washed with water and, if appropriate, converted to the chloride, hydroxide, sulfate form using aqueous common salt solution. By means of the process according to the invention, degrees of conversion of the tertiary amino groups to quaternary ammonium groups of greater than 95, preferably greater than 98, and in particular greater than 99,% may be achieved.

The percentages in the following examples are all based on weight.

EXAMPLE 1

3000 l of N,N-dimethylamino-methyl-polystyrene are suspended in 4000 l of demineralized water with stirring. The mixture is heated to 70° C. and a total of 477 kg of ethylene oxide is added in the course of 2 hours. The temperature is kept during this in the range from 70 to 75° C. During the addition of ethylene oxide, the pH of the batch is continuously monitored. The pH is kept in the range from 8 to 10 by simultaneous continuous addition of 250 to 350 l of 96% strength sulphuric acid. After the ethylene oxide addition is completed, the mixture is further stirred for 2 hours at 70° C. By stripping with nitrogen and subsequent pressure reduction to approximately 200 hPa, unreacted ethylene oxide is removed from the batch. The product is then transferred to a washing tower equipped with sieve plates and washed with demineralized water. 4000 l of 20% strength aqueous common salt solution are added and are left therein for 2 hours. The product is then washed to neutrality with demineralized water. The total capacity is measured in equivalents per liter (eq/l) and represents equivalents of basic groups in mol/liter ion exchange resin.

| | |
|---|---|
| Yield: | 4,500 l |
| Total capacity: | 1.15 eq/l |
| Degree of quaternization: | 99.5% |
| Content of low-molecular-weight polymers: | not detectable. |

EXAMPLE 2

Comparison Without pH Control 3000 l of N,N-dimethylamino-methyl-polystyrene are suspended in 4000 l of demineralized water with stirring. The mixture is heated to 70° C. and a total of 550 kg of ethylene oxide is added in the course of 4 hours. The temperature is kept during this in the range from 70 to 75° C. By stripping with nitrogen and subsequent pressure reduction to approximatley 200 hPa, unreacted ethylene oxide is removed from the batch. Excess of ethylene oxide is used because parts of ethylene oxide undergo self polymerization to polyethylene glykol. The reaction is run this way that the ion-exhanger is completely ethoxylated.

The product is then transferred to a washing tower equipped with sieve plates and washed with demineralized water. 4000 l of 20% strength aqueous common salt solution are added and left therein for 2 hours. The product is then washed to neutrality with demineralized water.

| | |
|---|---|
| Yield: | 4000 l |
| Total capacity: | 1.00 eq/l |
| Degree of quaternization: | 88.1% |
| Content of low-molecular-weight non-cross-linked polymers: | =2.5 g/ml. |

It will be understood that the specification and examples are illustrative but not limitative of the present invention and that other embodiments within the spirit and scope of the invention will suggest themselves to those skilled in the art.

What is claimed is:

1. A process for the preparation of strongly basic anion exchange polymers comprising cross-linked vinylaromatic polymers comprising reacting weakly basic anion exchange polymers bearing aromatic (tertiary amino)methyl groups with ethylene oxide, wherein the weakly basic anion exchange polymers are reacted with ethylene oxide at 70 to 75 C. and at a pH of 8 to 10.

2. A process according to claim 1, wherein the pH is maintained by continuous addition of sulphuric acid.

3. A process according to claim 1, wherein the vinylaromatic polymers further include up 10% by weight of at least one monoethylenically unsaturated nonaromatic monomer containing one copolymerizable double bond per molecule which is copolymerized into the vinylaromatic polymer.

4. A process according to claim 1, wherein the nonaromatic monomer is at least one selected from the group consisting of acrylic acid, methacrylic acid, acrylates, methacrylates, acrylonitrile, methacrylonitrile, acrylamide, methacrylamide, vinyl chloride, vinylidene chloride, and vinyl acetate.

5. A process according to claim 1, wherein the vinylaromatic polymers are crosslinked by copolymerizable crosslinking monomers having 2 or 3 copolymerizable C=C double bonds per molecule.

6. A process according to claim 1, wherein the vinylaromatic polymers are crosslinked with at least one crosslinking agent selected from the group consisting of polyfunctional vinylaromatics, polyfunctional allyl aromatics, polyfunctional vinyl and allyl heterocycles, N,N'-$C_1$–$C_6$-alkylenediacrylamides and -dimethacrylamides, polyvinyl ethers and polyallyl ethers of saturated $C_2$–$C_{10}$-polyols having 2 to 4 OH groups per molecule, esters of unsaturated $C_3$–$C_{12}$-alcohols or of saturated $C_2$–$C_{20}$-polyols having 2 to 4 OH groups per molecule, divinylethyleneurea and cycloaliphatic olefins have 2 or 3 isolated C=C. double bonds.

7. A process according to claim 1, wherein the vinylaromatic polymers are crosslinked with at least one crosslinking agent selected from the group consisting of di- and trivinylbenzenes, divinylethylbenzene, divinyltoluene, divinylxylene, divinylnaphthalene, diallylbenzenes, triallybenzenes, trivinyl cyanurate, triallyl cyanurate, trivinyl isocyanurate, triallyl isocyanurate, N,N'-methylenediacrylamides and -dimethacrylamides, N,N'-ethylenediacrylamides and -dimethacrylamide, ethylene glycol divinyi ether, ethylene glycol diallyl ether, diethylene glycol divinyl ether, diethylene glycol diallyl ether, allyl methacrylate, ethylene glycol di(meth)acrylate, glycerol tri (meth)acrylate, pentaerythritol tetra(meth)acrylate, divinylethyleneurea, divinylpropyleneurea, divinyl adipate, hexa-1,5-diene, 2,5-diemethylhexa-1,5-diene, octa-1,7-diene, 1,2,4-trivinylcyclohexane.

8. A process according to claim 1, wherein the crosslinking agent is (i) a divinylbenzene or (ii) a mixture of divinylbenzene and aliphatic $C_6$–$C_{12}$-hydrocarbons containing 2 or 3 C=C. double bonds.

9. A process according to claim 5, wherein the crosslinking agents are used in amounts ranging from 2 to 20% by weight based on the total amount of the polymerizable monomers used.

10. A process according to claim 5, wherein the crosslinking agents are used in amounts ranging from 2 to 12% by weight based on the total amount of the polymerizable monomers used.

11. A process according to claim 1, wherein the vinylaromatic polymers are crosslinked using as crosslinking monomers one or more benzenes or naphthalenes substituted with at least two vinyl and/or vinylidene groups.

12. A process according to claim 1, wherein the vinylaromatic polymers are obtained by polymerizing at least one of styrene, vinyltoluene, ethylstyrene, alpha-methylstyrene, chlorostyrene, o-chloromethylstyrene, m-chloromethylstyrene, p-chloromethylstyrene, vinylnaphthalene, and vinylpyridine and one or more crosslinking monomers containing more than one copolymerizable double bond per molecule and, optionally, one or more nonaromatic monomers containing at least one copolymerizable double bond per molecule.

* * * * *